United States Patent

Rokutan et al.

[11] Patent Number: 6,004,669
[45] Date of Patent: Dec. 21, 1999

[54] ELECTRICALLY-CONDUCTIVE MEMBER AND IMAGE FORMING APPARATUS USING THE SAME

[75] Inventors: Minoru Rokutan; Michiaki Yasuno; Naoki Ohnishi, all of Minami Ashigara, Japan

[73] Assignee: Fuji Xerox Co., Ltd., Tokyo, Japan

[21] Appl. No.: 08/996,059

[22] Filed: Dec. 22, 1997

[30] Foreign Application Priority Data

Dec. 25, 1996 [JP] Japan .................................... 8-345614

[51] Int. Cl.$^6$ .......................... B32B 27/40; G03G 15/02; G03G 15/16
[52] U.S. Cl. .......................... 428/335; 399/115; 399/116; 399/122; 428/36.91; 428/336; 428/423.3; 428/423.9; 428/424.4; 428/424.7; 428/424.8; 428/425.8; 492/48; 492/53
[58] Field of Search ................................... 428/335, 336, 428/421, 423.1, 423.3, 423.5, 423.9, 424.4, 424.8, 424.7, 425.8, 36.91, 492/48, 53; 430/98, 99; 399/115, 116, 122

[56] References Cited

U.S. PATENT DOCUMENTS 5,567,494 10/1996 Ageishi et al. ......................... 428/36.9

FOREIGN PATENT DOCUMENTS 5-134515  5/1993  Japan .

*Primary Examiner*—D. S. Nakarani
*Attorney, Agent, or Firm*—Oliff & Berridge, PLC

[57] ABSTRACT

The present invention provides an electrostatic charging member excellent in dispersibility of electrically-conducting agent and uniformity in resistance which causes no contamination of the material to be charged for a prolonged period of time. The present invention relates to an electrostatic charging member which electrostatically charging uniformly the surface of a material to be charged such as photoreceptor and dielectric material while pressing the material. An electrostatic charging member 1 has a two-layer structure comprising an electrically-conductive elastic material layer 1b formed on an electrically-conductive substrate 1a, and a resistance-controlling layer 1c covering the elastic material layer 1b. The resistance-controlling layer 1c comprises an electrically-conducting agent such as carbon black having a pH value of not more than 6 dispersed in an amine-modified polyurethane resin as a base polymer. The amine-modified polyurethane resin preferably comprises an amine component incorporated therein in an amount of from 0.02 to 1.0 mmol per g of the resin. The thickness of the resistance-controlling layer 1c preferably falls within the range of from 1 to 50 μm.

18 Claims, 4 Drawing Sheets

ELECTRICALLY-CONDUCTIVE MEMBER AND IMAGE FORMING APPARATUS USING THE SAME

FIELD OF THE INVENTION

The present invention relates to an electrically-conductive member, e.g., an electrostatic charging member, for use in image forming apparatus such as electrostatic recording apparatus and electrophotographic apparatus, e.g., an electrophotographic duplicating machine, printer, facsimile and composite OA machine comprising these machines. More particularly, the present invention relates to an electrostatic charging member which electrostatically charges uniformly the surface of a material to be charged such as photoreceptor and dielectric material while pressing the material.

BACKGROUND OF THE INVENTION

A contact charging method which comprises applying a voltage while pressing against the surface of a material to be charged such as photoreceptor to electrostatically charge the surface of the material to be charged is advantageous in that the required applied voltage is lower than that in corona charging method. As such an electrostatic charging member there has been widely used an electrically-conductive elastic material layer or an electrically-conductive material-coated roll, belt or blade. In order to render these electrostatic charging members electrically-conductive, a high molecular material such as rubber and resin comprises carbon black, a metal oxide or an ionically-conducting agent dispersed therein.

However, it is extremely difficult to obtain a solution having an electrically-conducting agent such as carbon black and metal oxide uniformly dispersed in a high molecular material. The coating layer formed by the insufficiently-dispersed solution has a high resistance moiety and a low resistance moiety. The resulting electrostatic charging member has a nonuniform resistance. Thus, image defects such as black streak and blank area attributed to uneven charging can occur. Further, leakage can occur between the low resistance moiety and pinholes present in the material to be charged, similarly causing image defects such as black streak.

For countermeasure against these troubles, an action such as incorporation of a dispersing aid in a high molecular material has been studied. For example, JP-A-5-134515 (The term "JP-A" as used herein means an "unexamined published Japanese patent application") proposes an electrostatic charging material comprising an electrically-conductive material and a material having a chemical interaction with the electrically-conductive material as a dispersing aid for the electrically-conductive material dispersed in an elastic matrix polymer.

However, the foregoing method comprising the incorporation of a dispersing aid is disadvantageous in that the uniformity in dispersion of electrically-conducting agent is not always sufficient and the dispersing aid or its unreacted components separate out from the high molecular material as bleedout, causing tack with the material to be charged. The foregoing method is also disadvantageous in that the bleedout of dispersing aid contaminates the material to be charged, resulting in the occurrence of image defects such as black streak and blank area.

Further, the ionically-conducting agent is excellent in resistance uniformity but is disadvantageous in that when kept in contact with the material to be charged over an extended period of time, ionic materials can migrate to the material to be charged, similarly causing image defects such as black streak and blank area.

SUMMARY OF THE INVENTION

It is therefore an object of the present invention to provide an electrically-conductive member, e.g., electrostatic charging member, excellent in dispersion of electrically-conducting agent and uniformity in resistance which does not contaminate the surface of the material to be charged over an extended period of time.

The foregoing object of the present invention will become more apparent from the following detailed description and examples.

The inventors made extensive studies of a method for preventing an electrostatic charging member for use in imaging apparatus from causing resistance unevenness resulting in image defect. As a result, it was found that when an acidic (oxidation-processed) electrically-conducting agent is dispersed in a modified resin having a functional group which has an acid-base interaction with the oxidation-processed electrically-conducting agent (e.g., amine-modified polyurethane resin) without any dispersion stabilizer as a resistance-controlling layer for adjusting the electrical resistance of the electrostatic charging member, an acid-base interaction occurs between the functional group (e.g., amino group) substituting on the modified resin (e.g., amine-modified polyerethan resin) base polymer and the electrically-conducting agent to cause the two components to be chemically bonded, resulting in the formation of a layer having the electrically-conducting agent extremely uniformly dispersed in the base polymer. Thus, the present invention has been worked out.

The present invention concerns an electrically-conductive member comprising an electrically-conductive substrate and a resistance-controlling layer, wherein the resistance-controlling layer comprises an oxidation-processed electrically-conducting agent dispersed in a modified resin as a base polymer, the modified resin having a functional group which has an acid-base interaction with the oxidation-processed electrically-conducting agent. The present invention also concerns an image forming apparatus using the electrically-conductive member. The electrically-conductive member for use in the present invention may be applied to a charging member as well as a discharging member, transferring member, developing member and cleaning roller.

For example, the present invention concerns an electrically-conductive electrostatic charging member which electrostatically charges the surface of a material to be charged by applying a voltage to the material while pressing the material, wherein the electrically-conductive charging member comprises an electrically-conductive substrate and a resistance-controlling layer, and the resistance-controlling layer comprises an oxidation-processed electrically-conducting agent (e.g., electrically-conducting agent having a pH value of not more than 6) dispersed in a modified resin (e.g., an amine-modified polyurethane resin) as a base polymer. An electrically conductive elastic material layer may be provided on the electrically-conductive substrate.

BRIEF DESCRIPTION OF THE DRAWINGS

By way of example and to make the description more clear, reference is made to the accompanying drawings in which.

DETAILED DESCRIPTION OF THE INVENTION

The present invention will be further described hereinafter.

Figure 1A:
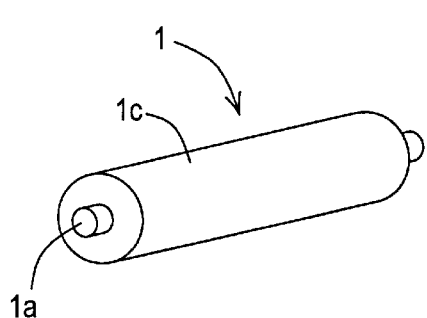
FIG. 1A is a perspective view illustrating a two-structure electrostatic charging member as an embodiment of the present invention.
Figure 1B:
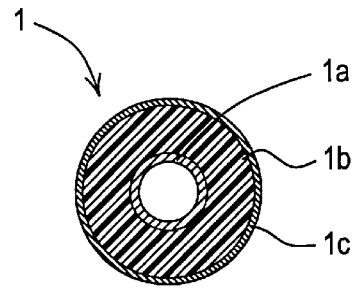
FIG. 1B is a sectional view of FIG. 1A.

If used as an electrostatic charging roll, the electrostatic charging member according to the present invention is composed of an electrically-conductive member comprising an electrically-conductive elastic material layer 1b fixed to the outer periphery of a rod-like or tubular electrically-conductive substrate 1a, and a resistance-controlling layer 1c covering the outer periphery of the electrically-conductive substrate 1a as shown in FIG. 1. In the present invention, the electrically-conductive elastic material layer is an optional layer, which may not be provided. Further, an interlayer may be provided interposed between the elastic material layer 1b and the resistance-controlling layer 1c. Alternatively, the outer periphery of the resistance-controlling layer 1c may be covered by a protective layer. Accordingly, the electrostatic charging member according to the present invention may take a multi-layer structure comprising 2 to 4 layers.

The electrically-conductive substrate 1a acts as an electrode as well as a supporting member for the electrostatic charging member. It is formed by a metal or alloy such as aluminum, copper alloy and stainless steel (SUS) or an electrically-conductive material such as chromium or nickel-plated iron or synthetic resin. The outer diameter of the electrically-conductive substrate normally falls within the range of from 4 to 12 mm.

The electrically-conductive elastic material layer 1b may be provided to allow the electrostatic charging member to have predetermined resistivity and hardness so that it can be pressed onto the surface of the material to be charged at a proper nip or nip pressure to make a uniform electrostatic charging of the surface of the material to be charged. The elastic material layer is formed by dispersing an electrically-conducting agent in a rubber material.

The rubber material is not specifically limited. Examples of the rubber material employable herein include natural rubber, isoprene rubber, chloroprene rubber, epichlorohydrin rubber, butyl rubber, norbornene rubber, silicone rubber, urethane rubber, fluororubber, acrylic rubber, SBR, NBR, EPDM, and acrylonitrile-styrene-butadiene rubber. Two or more of these rubber materials may be blended.

Particularly preferred among these rubber materials are silicone rubber, SBR, and EPDM. These rubber materials may be used in foamed or unfoamed form.

As the electrically-conducting agent there may be used one or more of various metals or alloys such as carbon black, graphite, aluminum, copper, nickel and SUS, various electrically-conductive metal oxides such as tin oxide, indium oxide, titanium oxide, zinc oxide, potassium titanate, tin oxide-antimony oxide composite oxide and tin oxide-indium oxide composite oxide, and surface electrically-conducted insulating materials, in particulate form.

The thickness of the electrically-conductive elastic material layer may normally range from 1 to 5 mm, particularly from 2 to 4 mm. The volume resistivity of the electrically-conductive elastic material layer is closely related to the volume resistivity of the resistance-controlling layer described later and preferably ranges from $10^3$ to $10^6$ Ω·cm.

If the electrically-conductive elastic material layer is formed by a rubber material other than silicone rubber and foamed rubber, the rubber material may comprise a softening agent incorporated therein to reduce the rubber hardness thereof. In this case, the exudation of the softening agent or the bleeding of the rubber itself can cause the contamination of the surface of the material to be charged. Therefore, an interlayer is preferably provided on the elastic material layer.

The interlayer preferably is preferably formed by a polyamide resin, polyurethane resin or fluororubber comprising an electrically-conducting agent incorporated therein in a proper amount. Particularly preferred among these resins are N-methoxymethylated polyamide resin and fluororubber comprising vinylidene fluoride as a main ingredient. The thickness of the interlayer is not specifically limited. In practice, however, it preferably falls within the range of from 2 to 50 μm.

The resistance-controlling layer 1c is provided to adjust the resistivity of the electrostatic charging member to a predetermined value and is formed by a thin layer comprising an oxidation-processed electrically-conducting agent (e.g., electrically-conducting agent having a pH value of not more than 6) dispersed in a modified resin (e.g., amine-modified polyurethane resin) as a base polymer.

The high molecular material which can be properly blended with the base polymer is not specifically limited. In practice, however, acrylic resin, urethane resin, acryl-modified urethane resin, etc. are desirable. The content of the high molecular material is preferably not more than 30% by weight, more preferably not more than 20% by weight based on the total weight of the polymer constituting the resistance-controlling layer.

The modified resin may be modified by an amine group, a hydroxy group, a carboxyl group or a nitro group, and examples of the resin for the modified resin include a polyurethane resin and an acryl resin. Of them, an amine-modified polyurethane resin is preferred.

As the amine-modified polyurethane resin there may be normally used a product of the reaction of an organic polyisocyanate with a long-chain polyol and optionally a chain extender in the presence of a catalyst. The amine component is preferably introduced into either or both of the long-chain polyol and the chain extender as a substituent.

Examples of the organic polyisocyanate employable herein include aliphatic diisocyanate such as tetramethylene diisocyanate, hexamethylene diisocyanate, 3-methyl-1,5-pentane diisocyanate and lysine diisocyanate, alicyclic diisocyanate such as isophorone diisocyanate, hydrogenated tolylene diisocyanate, hydrogenated xylylene diisocyanate, hydrogenated tetramethyxylylene diisocyanate and hydrogenated diphenylmethane diisocyanate, aromatic diisocyanate such as m-phenylene diisocyanate, p-phenylene diisocyanate, 2,4-tolylene diisocyanate, 2,6-tolylene diisocyanate, m-xylylene diisocyanate, p-xylylene diisocyanate, diphenyl-4,4'-diisocyanate, 2-nitrodiphenyl-4, 4'-diisocyanate, 3,3'-dimethoxydiphenyl-4,4'-diisocyanate, diphenylmethane-2,4'-diisocyanate, diphenylmethane-4,4'-diisocyanate, 3,3'-dimethyldiphenylmethane-4,4'-diisocyanate, β,β-diphenylpropane-4,4'-diisocyanate, diphenylether-4,4'-diisocyanate, 1,4-naphthylene diisocyanate and 1,5-naphthylene diisocyanate, polymer thereof, polyol adduct such as trimethylolpropane, and prepolymer of isocyanate-terminated polyisocyanate with polyol.

Examples of the long-chain polyol employable herein include (a) polyester polyol, (b) polycarbonate polyol, (c) polybutadiene polyol, (d) polyether polyol, and copolymer polyol thereof.

Examples of (a) polyester polyol include polyester polyol and polyester amide polyol obtained by the condensation reaction of a reactive acid derivative such as dibasic acid, its ester, acid halide and acid anhydride with glycol and amino alcohol, singly or in admixture.

Examples of the foregoing dibasic acid include dicarboxylic acid such as succinic acid, adipic acid, sebasic acid, azelaic acid, phthalic acid, isopthalic acid, terephthalic acid, hexahydrophthalic acid, hexahydroisophthalic acid, hexahydroterephthalic acid, and reactive acid derivative thereof.

As the foregoing glycol there may be used ethylene glycol, propylene glycol, 1,3-propanediol, 1,2-butanediol, 1,4-butanediol, 1,5-pentanediol, neopentylene glycol, 1,6-hexanediol, 3-methyl-1,5-pentanediol, 1,8-octanediol, 1,9-nonanediol, diethylene glycol, triethylene glycol, dipropylene glycol, 1,4-cyclohexane dimethanol, and ethylene oxide or propylene oxide adduct of bisphenol A, singly or in admixture.

Examples of the foregoing amino alcohol include ethanolamine, propanolamine, and ∈-aminohexanol. The foregoing glycol may be partially substituted by a diamine such as hexamethylenediamine, isophoronediamine and xylylenediamine. A further example of the amino alcohol includes lactone polyester polyol obtained by the ring opening polymerization of lactone monomer such as ∈-caprolactone.

The polycarbonate polyol (b) can be obtained by the dealcoholation reaction of the foregoing polyvalent alcohol with ethylene carbonate, diemethyl carbonate, diethyl carbonate, diphenyl carbonate or the like.

As the polybutadiene polyol (c) there may be used a polybutadiene substituted by two or more hydroxyl groups in its polymer main chain or side chain.

Examples of (d) polyether polyol include polyethylene glycol, polypropylene glycol and polytetramethyleneether polyol obtained by the ring opening polymerization of ethylene oxide, propylene oxide, tetrahydrofuran, etc., copolymers of these polyether polyols with polybutadiene polyols, and polyester ether polyols comprising the foregoing polyester polyol or polycarbonate polyol as a copolymerizable component.

The foregoing long-chain polyol preferably has a molecular weight of from 300 to 10,000.

A chain extender is generally a compound having two or more active hydrogens per molecule having a weight of less than 300. The polyol component, polyamine component and amino alcohol component of the foregoing long-chain polyol, etc. may be used. Besides these compounds, water or urea may be used as a chain extender.

The amine component to be incorporated in the amine-modified polyurethane resin is not specifically limited so far as it is a basic nitrogen-containing compound capable of forming a polymer main chain. In particular, the foregoing product of the reaction of an amino-substituted compound of polyester polyol and/or chain extender with an organic polyisocyanate is desirable. At least one amino group may be introduced into a urethane polymer.

If the amine component is a primary amine or secondary amine, it partially reacts with the organic polyisocyanate. In this case, it is preferred that a long-chain polyol and/or chain extender which has been N-acylated with acetyl group, benzoyl group or the like be allowed to undergo polyurethanization reaction followed by deacylation by dehydration. Specific examples of the amine component will be given below. Tertiary amine components are preferably used.

Examples of the primary amine component include 2-amino-1,3-propanediol, aminomethyl ethylene glycol, β-aminoethyl propylene glycol, 4-amino-1,2-butanediol, 2-amino-1,4-butanediol, 5-amino-1,2-pentanediol, 2-amino-1, 5-pentanediol, 2-amino-1,6-hexanediol, 3-amino-1,6-hexanediol, 2-amino-1,7-heptanediol, 2-amino-1,8-octanediol, 4-aminocyclohexylethylene glycol, α-(4-hydroxycyclohexyl)ethanolamine, 2-(o-aminophenyl)-1,3-propanediol, 2-(p-aminophenyl)-1,3-propanediol, 2-(p-aminophenyl)-1,4-butanediol, p-(2-hydroxymethyl-3-hydroxypropyl)aniline, and p-(3-hydroxymethyl-4-hydroxybutyl)aniline.

Examples of the secondary amine component include diethanolamine, dipropanolamine, dibutanolamine, dihexanolamine, dioctanolamine, N-hydroxymethylethanolamine, N-(2-hydroxypropyl) ethanolamine, N-(2-hydroxybutyl) ethanolamine, N-(4-hydroxybutyl)ethanolamine, N-(2-hydroxyhexyl) ethanolamine, N-(6-hydroxyhexyl)ethanolamine, N-(4-hydroxycyclohexyl)ethanolamine, N-(o-hydroxyphenyl) ethanolamine, N-(p-hydroxyphenyl)ethanolamine, N-(p-hydroxybenzyl)ethanolamine, N-(β-hydroxyphenylpropyl) ethanolamine, N-methyl-p-(2-hydroxymethyl-3-hydroxypropyl) aniline, and N-methyl-p-(3-hydroxymethyl-4-hydroxybutyl)aniline.

Examples of the tertiary amine component include N-methyldimethanolamine, N-methyldiethanolamine, N-methyldipropanolamine, N-methyldibutanolamine, N-methyldihexanolamine, N-methyldioctanolamine, N-ethyl-substituted compound, N-propyl-substituted compound, N-butyl-substituted compound and N-phenyl-substituted compound thereof, 3-dimethylamino-1,2-propanediol, 4-dimethylamino-1, 2-butanediol, 5-dimethylamino-1,2-pentanediol, diethylamino compound thereof, p-(2-hydroxymethyl-3-hydroxypropyl)-N, N-dimethylaniline, p-(3-hydroxymethyl-4-hydroxybutyl)-N, N-dimethylaniline, diethylaniline compound and triphenylamine compound thereof, and N-(3-dimethylaminopropyl) diisopropanolamine.

These organic polyisocyanates, long-chain polyols, chain extenders and amine components may be used singly or in admixture. The long-chain polyol having an amine component incorporated therein preferably has a molecular weight of from 300 to 10,000.

The amine-modified urethane polymer may be produced by a known polyurethanization reaction. Examples of the catalyst employable in the polyurethanization reaction include tertiary amines such as triethylamine, metal carboxylates such as potassium acetate and zinc stearate, and organic metal compounds such as dibutyltin dilaurate, dioctyltin dilaurate and dibutyltin oxide. The polyurethanization reaction can be carried out by mixing the reaction materials, catalyst, etc. in the absence of solvent. However, the reaction can be effected in an organic solvent to advantage in the formation of the resistance-controlling layer by a coating method.

In some detail, an electrically-conducting agent is added to a solution of a material or product of the polyurethanization reaction. The mixture is then optionally blended with the foregoing high molecular material. The resulting dispersion is then diluted with a solvent depending on the viscosity and solid content concentration of the dispersion to facilitate coating. A hardener is then optionally added to the dispersion. The coating solution thus obtained is applied to the electrically-conductive elastic material layer or interlayer, and then dried to undergo curing. Thus, a resistance-controlling layer can be formed more simply.

As the organic solvent there may be used benzene, toluene, methyl ethyl ketone (MEK), methyl isobutyl ketone, dioxane and ethyl acetate, singly or in admixture. As the hardener there may be used a polyisocyanate compound. In particular, an isocyanate-terminated low molecular compound is desirable. Examples of such an isocyanate-terminated low molecular compound include Colonate L, Colonate 2030, Colonate HX and Colonate HL (available from Nippon Polyurethane Industry Co., Ltd.), Desmodur L, Desmodur N-3300 and Desmodur HT (available from Bayer Inc.), and Takenate D-102, Takenate D-160N and Takenate D-170N (available from Takeda Chemical Industries, Ltd.).

The amine-modified polyurethane resin constituting the resistance-controlling layer preferably comprises an amine component incorporated therein in an amount of from 0.02 to 1.0 mmol, more preferably from 0.1 to 0.3 mmol per g of the resin. If the content of the amine component falls below 0.02 mmol, it cannot undergo thorough acid-base interaction with the electrically-conducting agent, making it difficult to uniformly disperse the electrically-conducting agent in the resistance-controlling layer. On the contrary, if the content of the amine component exceeds 1.0 mmol, the reaction with the organic polyisocyanate proceeds so rapidly that the coating solution for forming the resistance-controlling layer exhibits practically too short a pot life.

An electrically-conducting agent similar to the particulate material for rendering the elastic material layer electrically-conductive may be dispersed in the resistance-controlling layer. However, the electrically-conducting agent to be dispersed in the resistance-controlling needs to exhibit a pH value of 6, which has an interaction with the modified resin (e.g., amine-modified polyurethane resin). In particular, carbon black is desirable and favorable for cost because it can be easily adjusted to a pH value of not more than 6 when subjected to oxidation. The electrically-conducting agent may be called as an electrically-conducting agent having a functional group which has an acid-base interaction with an amino group of the resin, or an oxidation-processed electrically-conducting agent.

Specific examples of carbon black employable herein include products available from Cabot Specialty Chemicals Inc. such as Mogul-L having a grain diameter of 24 nm, an oil absorption of 60 ml/100 g, a specific surface area of 138 $m^2/g$ and a pH value of 2.5 (obtained by oxidation), Regal-400R having a grain diameter of 25 nm, an oil absorption of 69 ml/100 g, a specific surface area of 96 ml/100 g and a pH value of 4.0 (obtained by oxidation) and Monarch 1000 having a grain diameter of 16 nm, an oil absorption of 105 ml/100 g, a specific surface area of 343 ml/100 g and a pH value of 2.5 (obtained by oxidation). The foregoing oil absorption as defined herein is determined by the amount (ml) of dibutyl phthalate absorbed by 100 g of carbon black according to ASTM D2414-6TT.

If the amine-modified polyurethane resin comprises carbon black having a pH value of not more than 6 dispersed therein, the amino group in the polyurethane resin undergoes acid-base interaction with a functional group in carbon black such as hydroxyl group and carboxyl group to provide drastic enhancement of the dispersibility of carbon black. At the same time, the chemical interaction inhibits secondary agglomeration of carbon black, eliminating the scattering of resistivity of the resistance-controlling layer and hence providing a drastic enhancement of uniformity in the resistance of the electrostatic charging member.

As shown in the content characteristic curve described later (FIG. 5), the specific volume resistivity of the carbon black-dispersed amine-modified polyurethane resin shows a sudden change in a region where the content of carbon black is small (instable region) but shows little or no change in a region where the content of carbon black exceeds a predetermined value (stable region). The term "stable region" as used herein is meant to indicate a region where the drop of the specific volume resistivity of the foregoing resin stays not more than one hundredth (log $\Omega \cdot cm$) even when the increase in the content of carbon black is 10 parts by weight based on 100 parts by weight of the amine-modified polyurethane resin.

Accordingly, the content of carbon black lies preferably in a stable region where the specific volume resistivity shows little or no change, more preferably in the vicinity of the lower limit of the stable region.

The specific volume resistivity of the resistance-controlling layer preferably falls within the range of from $10^5$ to $10^{11}$ $\Omega \cdot cm$, more preferably from $10^6$ to $10^9$ $\Omega \cdot cm$ during the application of a voltage of 100 V. If the specific volume resistivity of the resistance-controlling layer falls below $10^5$, excessive current flows in the surface of the material to be charged, making it easy to cause leakage if pinholes occur on the surface of the material to be charged. On the other hand, if the specific volume resistivity of the resistance-controlling layer exceeds $10^{11}$ $\Omega \cdot cm$, it is made difficult to electrostatically charge the material to be charged at a low voltage, causing the occurrence of image defects due to the lack of charge.

The thickness of the resistance-controlling layer preferably falls within the range of from 1 to 50 $\mu m$. If the thickness of the resistance-controlling layer falls below 1 $\mu m$, leakage can easily occur on the surface of the material to be charged. On the contrary, if the thickness of the resistance-controlling layer exceeds 50 $\mu m$, the existing coating method can difficultly provide a predetermined coating layer unless wet-on-wet coating is effected. Even if a coating layer is formed, unevenness in thickness can occur.

The electrostatic charging member of the present invention may comprise a protective layer covering the surface thereof as necessary to inhibit the bleeding onto the surface of the material to be charged and the occurrence of tack. Such a protective layer is formed by a high molecular material such as polyamide resin, acrylic resin and acryl-modified polyamide resin.

The outer diameter of the electrostatic charging member according to the present invention preferably falls within the range of from 8 to 18 mm, more preferably from 12 to 14 $\mu m$. The specific volume resistivity of the electrostatic charging member according to the present invention preferably falls within the range of from $10^5$ to $10^{10}$ $\Omega \cdot cm$. The specific volume resistivity of the electrostatic charging member according to the present invention can be adjusted to the foregoing range by properly combining the resistivity of the electrically-conductive elastic material layer and the resistivity and thickness of the resistance-controlling layer.

A voltage is preferably applied across the electrically-conductive substrate $1a$ of the electrostatic charging member 1 and the material to be charged (e.g., photoreceptor 11 shown in FIG. 4) under constant current control.

The present invention has been described with reference to an electrostatic charging member in a roll form (electrostatic charging roll). The present invention can apply whatever form the electrostatic charging member of the present invention has. For example, the electrostatic charging member of the present invention may be in the form of a blade, brush or belt.

Figure 2A:
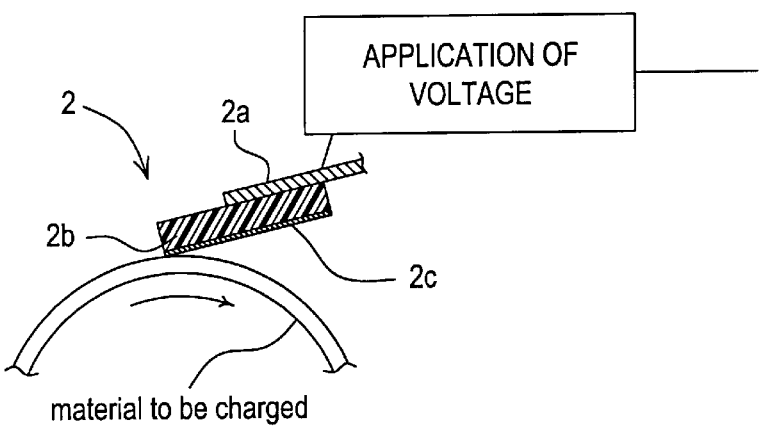
FIG. 2A illustrates a blade-like electrostatic charging number.
Figure 2B:
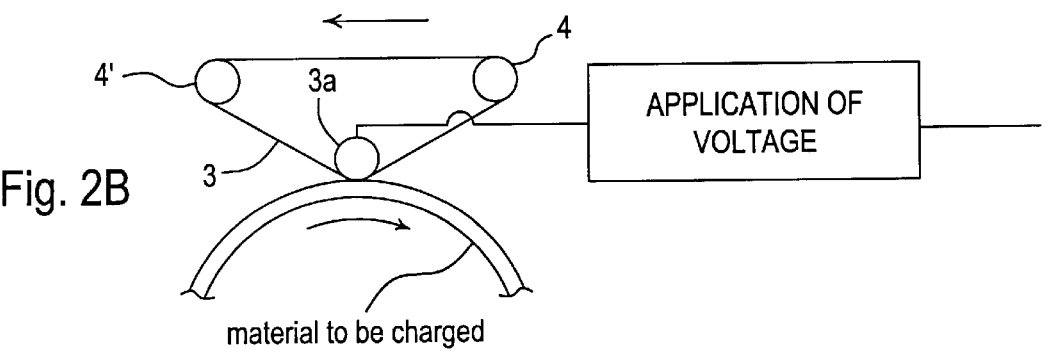
FIG. 2B illustrates a belt-like electrostatic charging member.

As sectionally shown in FIG. 2A illustrating an example of a two-layer structure, a blade-like electrostatic charging member comprises an electrically-conductive elastic material layer $2b$ bonded and fixed to a plate-like electrically-conductive substrate $2a$ on the side thereof opposite the material to be charged against which an electrostatic charging member 2 is pressed, and a resistance-controlling layer $2c$ covering the elastic material layer $2b$. In the case of a belt-like electrostatic charging member, a two-layer structure electrostatic charging member 3 which moves in the direction of arrow is stretched between an electrode roll (electrically-conductive substrate) $3a$ and belt conveyor rolls 4,4' and pressed against the material to be charged under the electrode roll $3a$ as shown in FIG. 2B. The belt-like electrostatic charging member 3 doesn't necessarily need to be moved but may be a fixed film-like electrostatic charging member. These electrostatic charging members may be in the foregoing three- or four-layer structure.

The electrostatic charging member according to the present invention may be applied to a transferring machine, discharging machine, developing machine and cleaning roller besides an electrostatic charging machine. When used as an electrostatic charging member in such a transferring machine, the electrostatic charging member is pressed against a material to be charged such as a photoreceptor with a transferring material such as paper interposed therebetween. The specific volume resistivity of the electrostatic charging member is adjusted to a range of from $10^7$ to $10^{10}$ $\Omega \cdot cm$.

The electrostatic charging member according to the present invention exerts the following effects.

The modified resin (e.g., amine-modified polyurethane resin) comprises an amino group substituted in the polymer main chain. The amino group has an acid-base interaction with an electrically-conducting agent such as carbon black having a pH value of not more than 6. Thus, the dispersibility of the electrically-conducting agent can be drastically enhanced. The chemical interaction is far stronger than the physical secondary agglomeration force of the electrically-conducting agent. Thus, the secondary agglomeration of electrically-conducting agent grains doesn't develop, causing the electrically-conducting agent to be uniformly dispersed in the resistance-controlling layer. Accordingly, the uniformity in resistance of the electrostatic charging member can be drastically enhanced.

As a result, image defects such as black streak and blank area attributed to nonuniformity in resistance don't occur. Further, no dispersing aids or other like agents are used. Therefore, image defects attributed to tack to or contamination of the surface of the material to be charged due to the bleeding of these agents don't occur.

The present invention will be further described in the following examples, but the present invention should not be construed as being limited thereto.

(Imaging apparatus)

Figure 3:
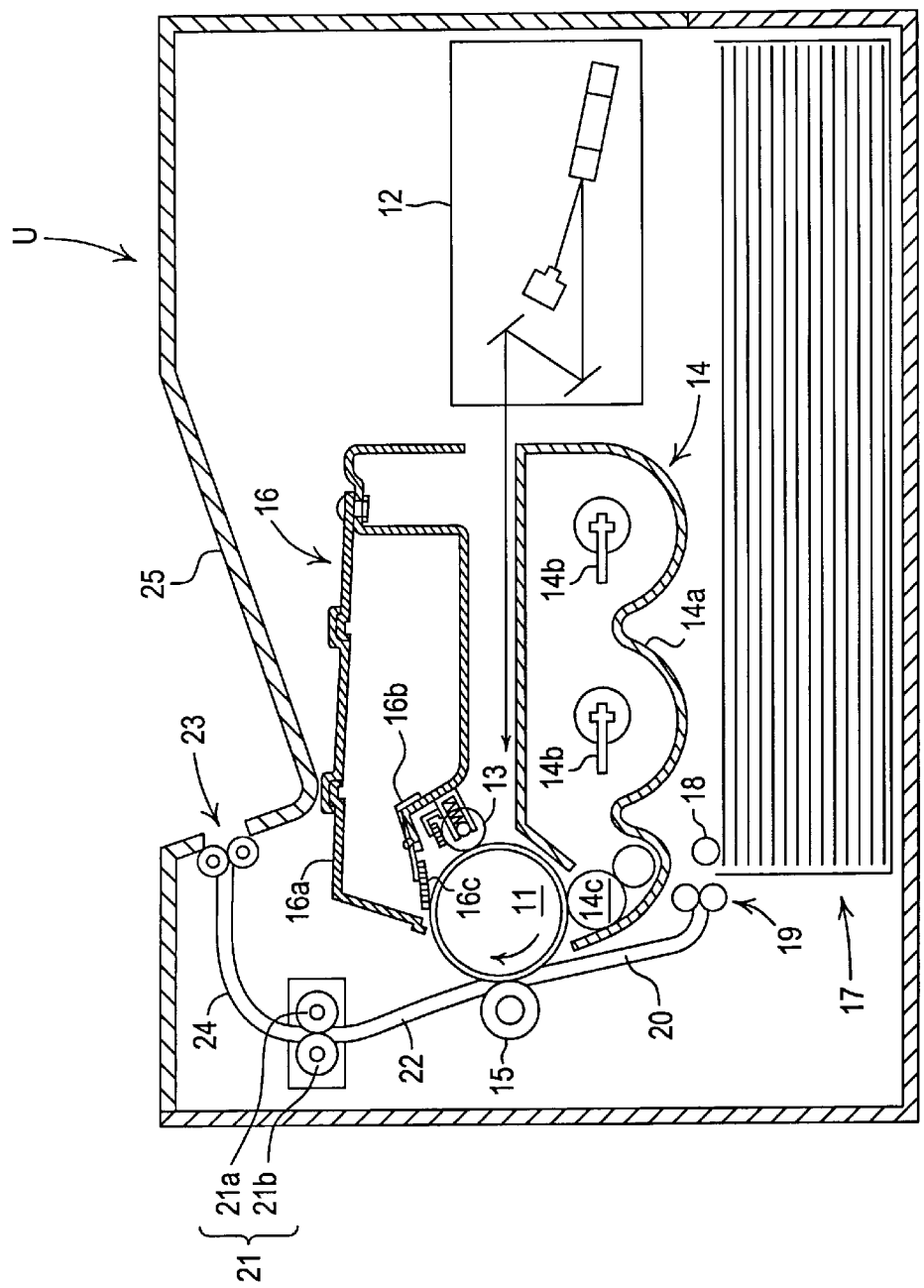
FIG. 3 is a diagram illustrating an imaging apparatus in which the electrostatic charging member according to the present invention is mounted.

FIG. 3 is a diagram illustrating an imaging apparatus comprising the electrostatic charging member of the present invention shown in FIG. 1 mounted in the electrostatic charging zone.

In FIG. 3, provided inside the main body of an imaging apparatus U is a cylindrical photoreceptor (drum) 11 which rotates in the direction of arrow. The photoreceptor 11 acts as an electrostatic latent image carrier. Provided on one inner side of the main body of the imaging apparatus U is a laser writing device 12 which writes an electrostatic latent image on the surface of the photoreceptor 11. Provided around the photoreceptor 11 are an electrostatic charging machine 13 which uniformly charges the surface of the photoreceptor sequentially along the direction of rotation, a developing machine 14 which renders the electrostatic latent image visible, a transferring machine 15 which transfers the visible toner image to a paper (transferring material), and a cleaning device 16 which removes the residual toner from the photoreceptor 11.

The foregoing developing machine 14 is provided with a container $14a$ housing the toner. Provided in the container $14a$ are agitating members $14b$, $14b$ for agitating the toner, a rotatable developer carrier $14c$, and a toner feed roller $14d$ for feeding the toner into the carrier $14c$. The developer carrier $14c$ fronts on the opening of the container $14a$, faces the surface of the photoreceptor 11 with a slight gap provided therebetween and is supported by the container $14a$. The cleaning device 16 is provided with a casing $16a$. Fixed to the casing $16a$ is a metallic blade holder $16b$ having a cleaning blade $16c$ fixed to the tip thereof. The cleaning blade $16c$ is in contact with the surface of the photoreceptor 11 at the edge thereof.

Provided at the bottom of the main body of the imaging apparatus U is a paper feed tray 17 housing the paper. Provided above one end of the paper feed tray 17 is a paper pickup roller for picking up the paper from the paper feed tray 17 one sheet by one sheet. Provided above the side of the paper pickup roller 18 are a pair of paper guides 20 for guiding the paper while being conveyed over a pair of paper conveying rollers 19.

Provided above the other inner side of the main body of the imaging apparatus U is a fixing device 21 comprising a heating roll $21a$ and a pressing roll $21b$. Provided interposed between the fixing device 21 and the foregoing transferring machine 15 is a conveying path 22 along which the paper onto which a toner image has been transferred is conveyed. Provided above the fixing device 21 are a pair of discharge rollers 23 and a conveying path 24 through which the paper on which a toner image has been fixed is guided from the fixing device 21 to the discharge rollers 23. Formed above the main body of the imaging apparatus U is a discharge tray 25 on which the paper which has been discharged from the discharge rollers is placed.

(Electrostatic charging machine)

Figure 4:
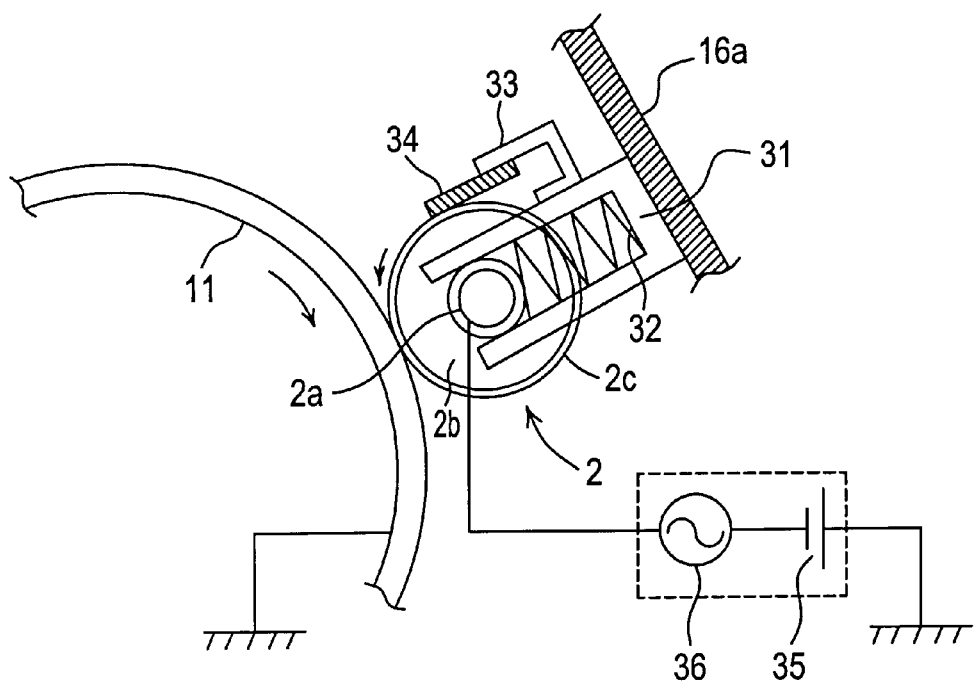
FIG. 4 is an enlarged view of the essential part of the electrostatic charging machine shown in FIG. 3.

FIG. 4 is an enlarged view of the essential part of FIG. 3 illustrating the structure of the foregoing electrostatic charging machine.

In FIG. 4, the electrostatic charging machine 13 is provided with the foregoing electrostatic charging roll 2. The electrostatic roll 2 is rotatably supported by a bearing member 31 fixed to the foregoing casing $16a$ of the cleaning device 16 at both ends of its electrically-conductive substrate $2a$. Acted on by an energizing power of two pressure springs each fixed to the bearing member 31 at one end thereof and to the end of the substrate 2a at the other, the electrostatic charging roll 2 is pressed against and brought into contact with the surface of the photoreceptor 11. Fixed to the foregoing bearing material 31 is a metallic pad holder 33 having a sheet-like cleaning pad 34 fixed to the tip thereof. In this arrangement, even an extremely slight amount of the toner attached to the surface of the electrostatic charging roll 2 can be removed.

Further, a superimposed oscillating voltage from a d.c. power supply 35 and an a.c. power supply 36 connected in series is applied to the substrate 1a of the electrostatic charging roll 1. Accordingly, the electrostatic charging roll 2 can provide uniform electrostatic charging on the surface of the photoreceptor 11 which rotates in a predetermined direction while being kept in contact with the resistance-controlling layer 2c.

The operation of the imaging apparatus U in the present invention is similar to that of the conventional imaging apparatus and will be briefly described below.

As mentioned above, the surface of the photoreceptor 11 is uniformly charged by the action of the electrostatic charging roll 2 to which a superimposed oscillation voltage has been applied. Onto which the photoreceptor 11 which has been uniformly charged is then written an electrostatic latent image by a laser writing device 12. The electrostatic latent image on the photoreceptor 11 is then developed to a toner image by the developing machine 14. The toner image thus formed is then transferred by the transferring machine 15 to a paper which has been conveyed from the paper feed tray 17. After the toner image thus transferred has been fixed by the fixing device 21, the paper is conveyed by the discharge rollers 23 and then discharged onto the discharge tray 25. After the toner image has been transferred to the paper, the residual toner on the surface of the photoreceptor 11 is removed by the blade 16c of the cleaning device in preparation for the subsequent imaging process.

The term "parts" as used hereinafter to indicate the content of various compositions is by weight.

EXAMPLE 1

100 parts of a millable silicone rubber compound comprising carbon black incorporated therein as an electrically-conducting agent (SE4637, available from Toray Dow Corning Silicone Co., Ltd.) and 1.5 parts of a vulcanizing agent containing a peroxide (RC-4 50 PFD, available from Toray Dow Corning Silicone Co., Ltd.) were kneaded by an open roll for 10 minutes to prepare a kneaded silicone rubber comprising carbon black uniformly dispersed therein.

Subsequently, an SUS shaft (1a) having an outer diameter of 6 mm which has been previously primer-coated was coaxially inserted into and supported by the center of a cylindrical mold having an inner diameter of 12 mm. The foregoing kneaded rubber was packed into the cavity of the mold, and then heated at a mold temperature of 170° C. for 3 minutes so that it was vulcanized and molded to form a roll having an outer diameter of 11.8 mm (thickness: 2.9 mm) comprising a carbon black-containing silicone rubber molded product as an electrically-conductive elastic material layer (1b).

The elastic material layer (1b) exhibited a hardness of 35° according to JIS A and a specific volume resistivity of $5 \times 10^6$ $\Omega \cdot cm$. The elastic material layer was extracted with toluene by Soxhlet's method for 24 hours. As a result, the total extraction was 2.5%.

To a coating compound (XN258, Nippon Polyurethane Industry Co., Ltd.) having a solid content of 15% by weight obtained by dissolving an amine-modified polyurethane in a 1:1 mixture of MEK and toluene was then added oxidized carbon black having a pH value of 2.5 (Mogul-L as mentioned above) in an amount of 75 parts based on 100 parts of the solid content. Subsequently, the mixture was subjected to dispersion by a sand grinder mill for 6 hours. To the mixture were then added 10 parts of an isocyanate hardener (Colonate 3041, available from Nippon Polyurethane Industry Co., Ltd.). The mixture was then stirred to prepare a coating solution.

The amine-modified polyurethane used above was a product of the reaction of diphenylmethane-4,4'-diisocyanate as an organic polyisocyanate with a polyester polyol such as 1,4-butanediol adipate and 1,6-hexanediol isophthalate as a long-chain polyol in the presence of 1,4-butanediol and N-methyldiethanolamine as a chain extender. The amine-modified polyurethane contained N-methyldiethanolamine as an amine component in an amount of 0.15 mmol/g.

The coating solution thus obtained was then applied to the outer periphery of the foregoing elastic material layer (1b) by dip coating method at a pull-up rate of 300 mm/min. The coating layer was air-dried to the touch, and then heated in a 120° C. oven for 30 minutes so that the amine-modified polyurethane resin was cured to form a resistance-controlling layer (1c) having a thickness of 6 μm composed of a uniform cured layer on the elastic material layer (1b).

Thus, an electrostatic charging roll (1) was produced.

EXAMPLE 2

An electrostatic charging roll was produced in the same manner as in Example 1 except that as carbon black there was used the previously mentioned Regal-400R, an oxidized product having a pH value of 4.0.

EXAMPLE 3

An electrostatic charging roll was produced in the same manner as in Example 1 except that as carbon black there was used the previously mentioned Monoarch 1000, an oxidized product having a pH value of 2.5.

COMPARATIVE EXAMPLE 1

An electrostatic charging roll was produced in the same manner as in Example 1 except that as the electrically-conducting agent there was used carbon black having a grain diameter of 24 nm, an oil absorption of 60 ml/100 g, a specific surface area of 112 $m^2/g$ and a pH value of 7.5.

COMPARATIVE EXAMPLE 2

An electrostatic charging roll was produced in the same manner as in Example 1 except that as the polyol component there was used a polyester polyol which is the same as used in Example 1 except that it is not amine-modified.

COMPARATIVE EXAMPLE 3

An electrostatic charging roll was produced in the same manner as in Comparative Example 2 except that an alkylsulfonate-based dispersing aid was added in an amount of 5 parts based on 100 parts of the polyester polyol.

The coating solutions prepared in the foregoing examples and comparative examples were each measured for weight-average grain diameter of secondarily agglomerated carbon black by means of a laser grain diameter analyzer (PAR-III, available from Otsuka Electronics Co., Ltd.). The results of the measurement and the structure of the resistance-controlling layers in the foregoing examples and comparative examples are set forth in Table 1 below.

TABLE 1

| Example No. | Resin material | Carbon black pH | Carbon black Grain diameter (nm) | Carbon black Oil absorption (ml/110 g) | Carbon black Specific surface area (m²/g) | Dispersing aid | Weight-average grain diameter (nm) |
|---|---|---|---|---|---|---|---|
| Example 1 | Amine-modified polyurethane | 2.5 | 24 | 60 | 138 | None | 140 |
| Example 2 | Amine-modified polyurethane | 4.0 | 25 | 69 | 96 | None | 153 |
| Example 3 | Amine-modified polyurethane | 2.5 | 16 | 105 | 343 | None | 167 |
| Comparative Example 1 | Amine-modified polyurethane | 7.5 | 24 | 60 | 112 | None | 305 |
| Comparative Example 2 | Unmodified polyurethane | 2.5 | 24 | 60 | 138 | None | 2,774 |
| Comparative Example 3 | Unmodified polyurethane | 2.5 | 24 | 60 | 138 | Added | 162 |

(Measurement of specific volume resistivity and image evaluation test)

In order to measure the electrical conductivity of the various electrostatic charging rolls, a voltage of 100 V was applied across the shaft (2a) of the electrostatic charging roll and a cylindrical electrode having a diameter of 10 mm and a width of 3.5 mm while the electrode was being pressed against the outer periphery of the electrostatic charging roll under a load of 30 g. Under these conditions, the resistivity was measured at 180 points on the electrostatic charging roll every 2° while the roll was being rotated once. This measurement was made on three peripheral lines on the electrostatic charging roll. The measurements were then averaged (log Ω·cm). The difference (log Ω·cm) between the maximum value and the minimum value in the measured resistivity values (180×3) was determined as "scattering of resistance".

Subsequently, the various electrostatic charging rolls were each mounted in the electrostatic charging machine (13) in an electrostatic recording printer (XP-10, available from Fuji Xerox Co., Ltd.). In the printer, a superimposed oscillating voltage from a 350 V d.c. power supply (35) and an a.c. power supply (36) having a peak-to-peak voltage ($V_{p-p}$) of 1.7 kV connected in series was applied across the shaft (2a) of the electrostatic charging member. After the completion of electrostatic charging, the procedure was effected according to ordinary method to form an image on the paper. This image evaluation test was effected under the conditions of ordinary humidity and temperature, low humidity and temperature (10° C./15% RH) and high humidity and temperature (35° C./85% RH). Thus, the environmental dependence of charging properties was evaluated.

In order to evaluate the bleeding properties of the various electrostatic charging rolls, they were allowed to stand at a temperature of 45° C. and 95% RH for 1 month. The various electrostatic charging rolls were each mounted in the foregoing printer. Under these conditions, an image was formed. Then, the occurrence of image defects due to bleedout onto the surface of the photoreceptor (OPC) was evaluated.

The results of these evaluations are set forth in Table 2 below.

TABLE 2

| Example No. | Specific volume resistivity (log Ω · cm) Average resistivity | Specific volume resistivity (log Ω · cm) Scattering of resistivity | Environmental dependence Ordinary temp.-humidity | Environmental dependence Low temp.-humidity | Environmental dependence High temp.-humidity | Bleeding |
|---|---|---|---|---|---|---|
| Example 1 | 9.58 | 0.25 | Good | Good | Good | Good |
| Example 2 | 8.68 | 0.33 | Good | Good | Good | Good |
| Example 3 | 5.47 | 0.40 | Good | Good | Good | Good |
| Comparative Example 1 | 5.30 | 1.11 | Good | Poor (fogged) | Poor (fogged) | Good |
| Comparative Example 2 | 9.96 | 1.52 | Good | Poor (fogged) | Poor (fogged) | Good |
| Comparative Example 3 | 10.12 | 0.31 | Good | Poor | Poor | Poor (blank area) |

Figure 5:
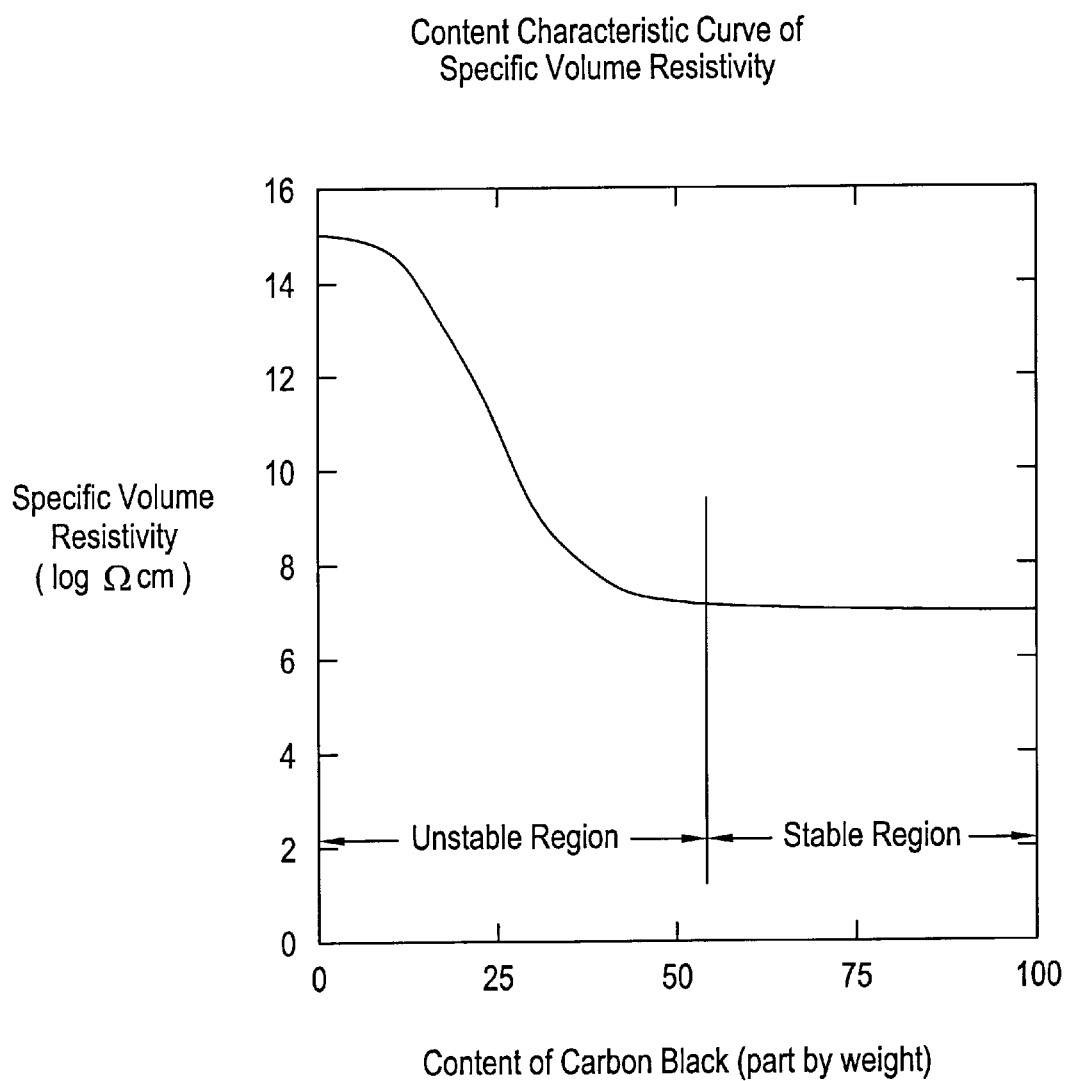
FIG. 5 is a content characteristic curve illustrating the specific volume resistivity of a carbon black-dispersed amine-modified polyurethane resin, wherein the reference numerals 1 to 3 indicate an electrostatic charging member, the reference numerals 1a to 3a indicate an electrically-conductive substrate, the reference numerals 1b, 2b indicate an electrically-conductive elastic material layer, the reference numerals 1c, 2c indicate a resistance-controlling layer, and the reference numeral 11 indicates a material to be charged (photoreceptor).

FIG. 5 is a content characteristic curve of specific volume resistivity illustrating the change of the specific volume resistivity of a carbon black-dispersed amine-modified polyurethane resin with the change of the content of carbon black (Mogul-L mentioned above) based on 100 parts of the amine-modified polyurethane resin as used in Example 1. As shown in the content characteristic curve, when the content of carbon black is not less than 40 parts, the amine-modified polyurethane resin shows little or no change in specific volume resistivity. When the content of carbon black is not less than 53 parts, the specific volume resistivity of the amine-modified polyurethane resin lies in the foregoing stable region.

As mentioned above, the stable region of the specific volume resistivity of the resistance-controlling layer lies in the vicinity of $10^{7.2}$ Ω·cm, though varying depending on the combination of a specific amine-modified polyurethane and carbon black. Thus, the present invention can easily provide an electrostatic charging member free of scattering of resistivity.

The electrically-conductive member (e.g., electrostatic charging member) according to the present invention comprises an electrically-conducting agent uniformly dispersed in the resistance-controlling layer. Thus, the electrostatic charging member according to the present invention has an excellent uniformity in resistance and hence causes no image defects attributed to nonunifomity in resistance in any atmosphere such as low humidity and temperature and high humidity and temperature. Further, the absence of substances other than the amine-modified polyurethane and electrically-conducting agent in the resistance-controlling layer makes it possible to eliminate the possibility of contamination by bleedout onto the surface of the material to be charged.

While the invention has been described in detail and with reference to specific embodiments thereof, it will be apparent to one skilled in the art that various changes and modifications can be made therein without departing from the spirit and scope thereof.

What is claimed is:

1. An electrically-conductive member comprising:
   an electrically-conductive substrate; and
   a resistance-controlling layer over the electrically-conductive substrate;
   wherein the resistance-controlling layer comprises an oxidation-processed electrically-conducting agent uniformly dispersed in a modified resin as a base polymer, the modified resin being modified by an amine group which has an acid-base interaction with the oxidation-processed electrically-conducting agent.

2. The electrically-conductive member according to claim 1, wherein the modified resin is a modified polyurethane resin.

3. The electrically-conductive member according to claim 1, wherein the oxidation-processed electrically-conducting agent has a pH value of not more than 6.

4. The electrically-conductive member according to claim 1, wherein the oxidation-processed electrically-conducting agent has a functional group which has an acid-base interaction with the modified resin.

5. The electrically-conductive member according to claim 1, further comprising an electrically-conductive elastic material layer between the electrically-conductive substrate and the resistance-controlling layer.

6. The electrically-conductive member according to claim 5, further comprising an interlayer between the electrically-conductive elastic material layer and the resistance-controlling layer.

7. The electrically-conductive member according to claim 1, wherein the electrically-conducting agent comprises carbon black.

8. The electrically-conductive member according to claim 7, wherein the amine-modified polyurethane resin is a product of the reaction of an organic polyisocyanate with a long-chain polyol and optionally a chain extender, and wherein at least one of a polyester polyol in the long-chain polyol and the chain extender contains an amine component in an amount of from 0.02 to 1.0 mmol per 1 g of the amine-modified polyuretihane resin.

9. The electrically-conductive member according to claim 7, wherein the resistance-controlling layer comprises a content of the carbon black that lies in a stable region of the content characteristic curve of the specific volume resisitivity of the amine-modified polyurethane resin vs. the content of the carbon black in which the specific volume resistivity of the amine-modified polyurethane resin comprising carbon black dispersed therein shows little or no change with changes in the content of carbon black.

10. The electrically-conductive member according to claim 9, wherein the carbon black is contained in an amount of 40 parts by weight or more based on 100 parts by weight of the amine-modified polyurethane resin.

11. The electrostatic charging member according to claim 1, wherein the thickness of the resistance-controlling layer ranges from 1 to 50 μm.

12. An electrically-conductive member comprising an electrically-conductive substrate and a resistance-controlling layer over the electrically-conductive substrate;
    wherein the resistance-controlling layer comprises an oxidation-processed electrically-conducting agent uniformly dispersed in a modified resin as a base polymer, the modified resin having a functional group that has an acid-base interaction with the oxidation-processed electrically-conducting agent; and
    wherein the oxidation-processed electrically-conducting agent has a pH value of not more than about 6.

13. The electrically-conductive member according to claim 12, wherein the modified resin is modified by an amine group and the electrically-conducting agent comprises carbon black.

14. The electrically-conductive member according to claim 12, wherein the modified resin is a modified polyurethane resin.

15. The electrically-conductive member according to claim 12, wherein the modified resin is an amine-modified polyurethane resin.

16. The electrically-conductive member according to claim 12, wherein the oxidation-processed electrically-conducting agent has a functional group that has an acid-base interaction with the modified resin.

17. The electrically-conductive member according to claim 15, wherein the electrically-conducting agent comprises carbon black.

18. An image forming apparatus comprising:
    a photoreceptor; and
    a charging member for charging the surface of the photoreceptor by applying a voltage to the photoreceptor while pressing the photoreceptor, the charging member is an electrically-conductive member that comprises an electrically-conductive substrate and a resistance-controlling layer over the electrically-conductive substrate,
    wherein the resistance-controlling layer comprises an oxidation-processed electrically-conducting agent uniformly dispersed in a modified resin as a base polymer, the modified resin being modified by an amine group which has an acid-base interaction with the oxidation-processed electrically-conducting agent.

* * * * *